(12) United States Patent
Ferreira

(10) Patent No.: US 11,102,085 B2
(45) Date of Patent: Aug. 24, 2021

(54) SERVICE IMPLEMENTATIONS VIA RESOURCE AGREEMENTS

(71) Applicant: HEWLETT-PACKARD DEVELOPMENT COMPANY, L.P., Houston, TX (US)

(72) Inventor: Ronaldo Rod Ferreira, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 66 days.

(21) Appl. No.: 16/081,225

(22) PCT Filed: Nov. 1, 2016

(86) PCT No.: PCT/US2016/059863
§ 371 (c)(1),
(2) Date: Aug. 30, 2018

(87) PCT Pub. No.: WO2018/084825
PCT Pub. Date: May 11, 2018

(65) Prior Publication Data
US 2019/0081868 A1    Mar. 14, 2019

(51) Int. Cl.
*H04L 12/24* (2006.01)
*G06F 15/177* (2006.01)
(Continued)

(52) U.S. Cl.
CPC ............ *H04L 41/5041* (2013.01); *G06F 8/60* (2013.01); *G06F 8/65* (2013.01); *G06F 15/177* (2013.01);
(Continued)

(58) Field of Classification Search
CPC ....... H04L 41/5041; H04L 47/70; G06F 8/60; G06F 15/177
(Continued)

(56) References Cited

U.S. PATENT DOCUMENTS

| 6,779,184 | B1 | 8/2004 | Puri et al. |
| 7,603,464 | B2 | 10/2009 | White |

(Continued)

FOREIGN PATENT DOCUMENTS

| JP | 2015-162907 | 9/2015 |
| KR | 2014-0015531 | 8/2015 |
| RU | 2573762 C1 | 1/2016 |

OTHER PUBLICATIONS

AllSeen Alliance: https://allseenalliance.org/.
(Continued)

*Primary Examiner* — Wing F Chan
*Assistant Examiner* — Leon Y Tseng
(74) *Attorney, Agent, or Firm* — HP Inc. Patent Department

(57) ABSTRACT

An example electronic device includes a processor to receive, from an intent publishing device, a resource agreement associated with a service to be implemented via the intent publishing device. The processor is further to transmit the resource agreement to a claiming device. The processor is further to receive a confirmation from the claiming device, wherein the confirmation is to indicate that the claiming device is to implement the resource agreement. The processor is further to match the intent publishing device with the claiming device based on the confirmation.

20 Claims, 7 Drawing Sheets

(51) Int. Cl.
  *G06F 21/62* (2013.01)
  *G06F 8/65* (2018.01)
  *G06F 21/44* (2013.01)
  *G06F 8/60* (2018.01)
  *H04L 12/911* (2013.01)

(52) U.S. Cl.
  CPC .......... *G06F 21/44* (2013.01); *G06F 21/6218* (2013.01); *H04L 41/5019* (2013.01); *H04L 41/5096* (2013.01); *H04L 47/70* (2013.01)

(58) Field of Classification Search
  USPC .......................................................... 709/226
  See application file for complete search history.

(56) References Cited

U.S. PATENT DOCUMENTS

| | | | |
|---|---|---|---|
| 8,844,024 B1* | 9/2014 | Graf | G06F 21/53 726/16 |
| 8,849,995 B1 | 9/2014 | Gabrielson et al. | |
| 9,009,294 B2 | 4/2015 | Dawson et al. | |
| 2003/0109272 A1 | 6/2003 | Mousseau et al. | |
| 2005/0021349 A1 | 1/2005 | Cheliotis et al. | |
| 2006/0036771 A1 | 2/2006 | Yokomura et al. | |
| 2006/0225075 A1 | 10/2006 | Mankovski et al. | |
| 2010/0332262 A1* | 12/2010 | Horvitz | G06Q 30/06 705/4 |
| 2011/0137805 A1 | 6/2011 | Brookbanks et al. | |
| 2013/0244704 A1 | 9/2013 | Szabo | |
| 2014/0012878 A1 | 1/2014 | Moussavian et al. | |
| 2016/0072804 A1* | 3/2016 | Chien | H04L 63/10 726/4 |
| 2016/0205036 A1* | 7/2016 | Jia | H04L 67/20 709/226 |

OTHER PUBLICATIONS

Cirani, S.; Davoli, L.; Ferrari, G.; Leone, R.; Medagliani, P.; Picone, M.; Veltri, L., "A Scalable and Self-Configuring Architecture for Service Discovery in the Internet of Things," IEEE Internet of Things, vol. 1, No. 5, pp. 508-521, Oct. 2014.

Collina, M.; Corazza, G.E.; Vanelli-Coralli, A., "Introducing the QEST broker: Scaling the IoT by bridging MQTT and REST." 23rd IEEE International Symposium on Personal Indoor and Mobile Radio Communications (PIMRC), pp. 36-41, 2012 IEEE.

Eclipse Ponte: http://www.eclipse.org/ponte.

Gubbi, J., et al, Internet of Things (IoT): A Vision, Architectural Elements, and Future Directions, < http://www.cloudbus.org/papers/Internet-of-Things-Vision-Future2012.pdf >.

Intel Common Connectivity Framework: https://software.intel.com/en-us/ccf.

IoTivity: https://www.iotivity.org/.

Jara, A.J.; Lopez, P.; Fernandez, D.; Castillo, J.F.; Zamora, M.A.; Skarmeta, A.F., "Mobile Digcovery: A Global Service Discovery for the Internet of Things," 27th International Conference on Advanced Information Networking and Applications Workshops (WAINA), pp. 1325-1330, 2013, IEEE.

Kim, J.; Lee, J., "OpenIoT: An open service framework for the Internet of Things," IEEE World Forum on Internet of Things (WF-IoT), pp. 89-93, 2014, IEEE.

Eclipse IoT Innitiative: http://iot.eclipse.org/.

McKinsey&Company.; "The Internet of Things: Mapping the Value Beyond the Hype," McKinsey Global Institute, pp. 144., Jun. 2015.

MQTT Version 3.1.1, OASIS Open Standard, Oct. 2014.

Ren, M., A Conciliation Mechanism for Self-organizing Dynamic Small Groups, Jun. 21, 2016, < http://www.ncbi.nlm.nih.gov/pmc/articles/PMC4916128/>.

Sarkar, C.; Nambi, A.U.S.N.; Prasad, R.V.; Rahim, A.; Neisse, R.; Baldini, G., "DIAT: A Scalable Distributed Architecture for IoT," IEEE Internet of Things, vol. 2, No. 3, pp. 230-239, Jun. 2015.

The Constrained Application Protocol (CoAP), Internet Engineering Task Force Standard—RFC 7258, Jun. 2014.

Macedo, W.; Rocha, T.; Ordonez, E. D. M., "GoThings: An Application Layer Gateway Architecture for the Internet of Things," 11th International Conference on Web Information.

System and technologies (WEBIST), pp. 6; 2015.

Schulzrinne Henning G et al: "The Session Initiation Protocol: Providing Advanced Telephony Services Across the Internet", Bell Labs Technical Journal, Wiley, CA, US,vol. 3, n.

Brian P. Gerkey et al "Murdoch: Publish/Subscribe Task Allocation for Heterogeneous Agents",Jun. 30, 2000,p. 203 and p. 204.

* cited by examiner

SERVICE IMPLEMENTATIONS VIA RESOURCE AGREEMENTS

BACKGROUND

In Internet of Things (IoT) context, a set of devices are connected together to sense and actuate over a defined environment. For example, a set of devices can be deployed around a house to perform a home automation service.

BRIEF DESCRIPTION OF THE DRAWINGS

Some examples of the present application are described with respect to the following figures.

DETAILED DESCRIPTION

Devices deployed for a particular service (e.g., home automation, environmental sensing, etc.) may be specifically configured to implement the functions of the particular service. However, re-purposing the devices for another service after deployment may be difficult.

Examples described herein provide an approach to implement a service via a service agreement. For example, an electronic device may include a processor. The processor may receive, from an intent publishing device, a resource agreement associated with a service to be implemented via the intent publishing device. The processor may also transmit the resource agreement to a claiming device. The processor may further receive a confirmation from the claiming device, where the confirmation is to indicate that the claiming device is to implement the resource agreement. The processor may further match the intent publishing device with the claiming device based on the confirmation. In this manner, examples described herein may reduce difficulty associated with re-purposing a device for different services.

Figure 1:
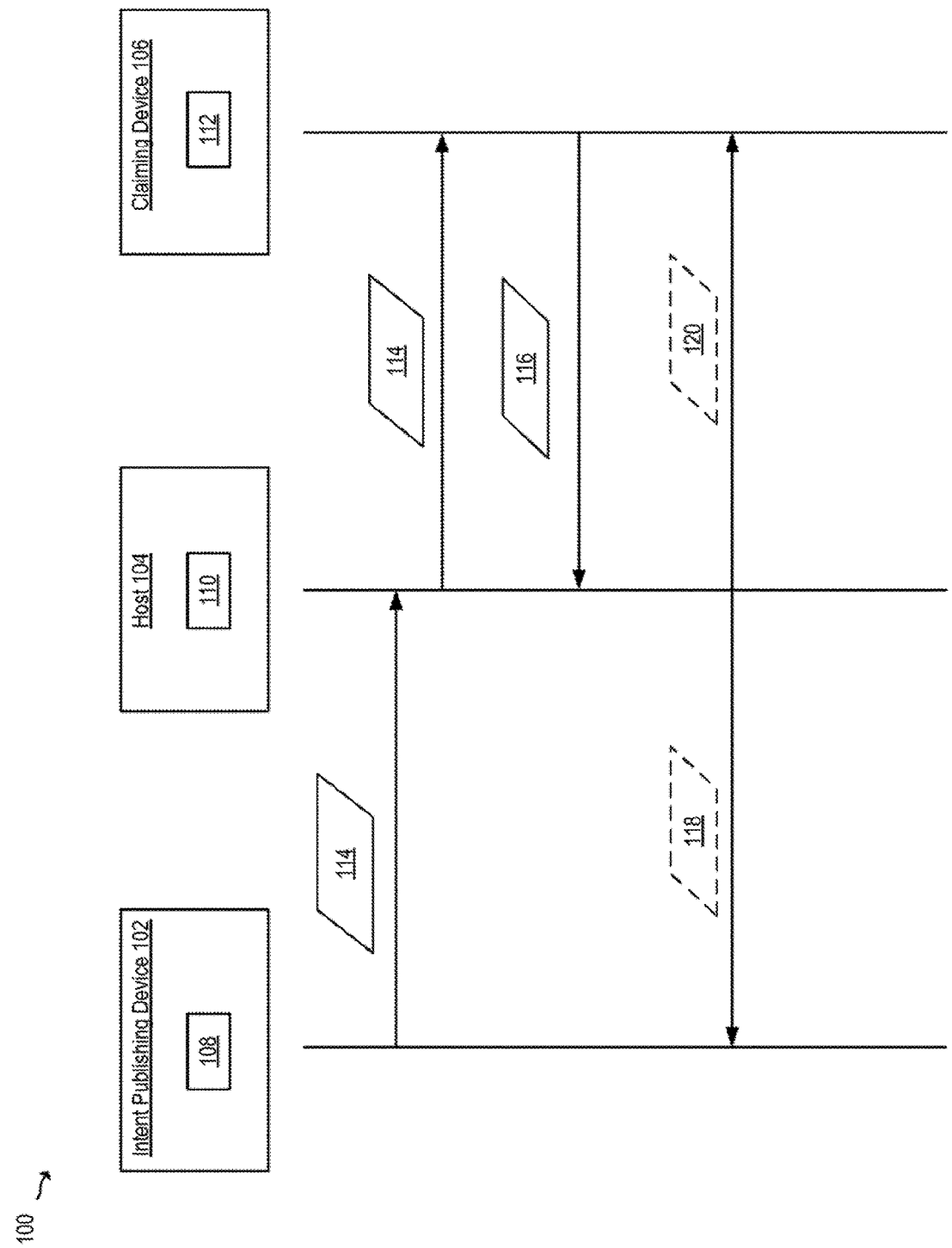
FIG. 1 illustrates a system to implement a service via a resource agreement, according to an example.

FIG. 1 illustrates a system 100 to implement a service via a resource agreement, according to an example. System 100 may include an intent publishing device 102, a host 104, and a claiming device 106. Each of intent publishing device 102, host 104, and claiming device 106 may be implemented using an electronic device, such as, a web-based server, a local area network server, a cloud-based server, a notebook computer, a desktop computer, an all-in-one system, a tablet computing device, a mobile phone, an electronic book reader, an appliance, a wearable electronic device, etc. Each of intent publishing device 102, host 104, and claiming device 106 may include a processor 108, 110, 112 to control operations of the corresponding device, respectively.

During operation, intent publishing device 102 may transmit a resource agreement (RA) 114 to host 104. RA 114 may be associated with a service that intent publishing device 102 is to implement. RA 114 may indicate a resource to be used to implement the service. The resource may be a hardware component, processor executable instructions, or a combination thereof. For example, a resource may be a camera, a sensor, a touch-sensitive display, a compass, an accelerometer, an operating system, an email client application, an Internet browser application, etc. In an example, intent publishing device 102 may implement a weather forecasting service. RA 114 may indicate that a device is to have a temperature or humidity sensor to collect data. As another example, RA 114 may indicate that a device is to have a display to present the weather forecasting data. Although one RA is shown in FIG. 1, it should be understood a particular service may have any number of RAs.

In response to a request from claiming device 106, host 104 may transmit RA 114 to claiming device 106. Claiming device 106 may determine whether claiming device 106 is to implement RA 114 (i.e., provide the resource indicated in RA 114). When claiming device 106 is to implement RA 114, claiming device 106 may transmit a confirmation 116 to host 104. Confirmation 116 may indicate that claiming device 106 is to implement RA 114.

In response to receiving confirmation 116, host 104 may match intent publishing device 102 with claiming device 106 so that claiming device 106 may provide the resource to intent publishing device 102 to implement the service. For example, host 104 may transmit identification information 118 of claiming device 106 to intent publishing device 102. Based on identification information 118, intent publishing device 102 may communicate with claiming device 106 to receive the resource. Identification information 118 may be an Internet protocol (IP) address of claiming device 106, a media access control (MAC) address of claiming device 106, or any other information that enables another device to communicate with claiming device 106.

As another example, host 104 may transmit identification information 120 of intent publishing device 102 to claiming device 106. Based on identification information 120, claiming device 106 may communicate with intent publishing device 102 to provide the resource. Identification information 120 may be an IP address of intent publishing device 102, a MAC address of intent publishing device 102, or any other information that enables another device to communicate with intent publishing device 102.

In some examples, the roles of intent publishing device 102, host 104, and/or claiming device 106 can change depending on the communication network, the type of service to be implemented, etc. For example, host 104 may be an intent publishing device in another communication network. Claiming device 106 may be an intent publishing device associated with a second service and intent publishing device 102 may be a claiming device associated with the second service.

Figure 2:
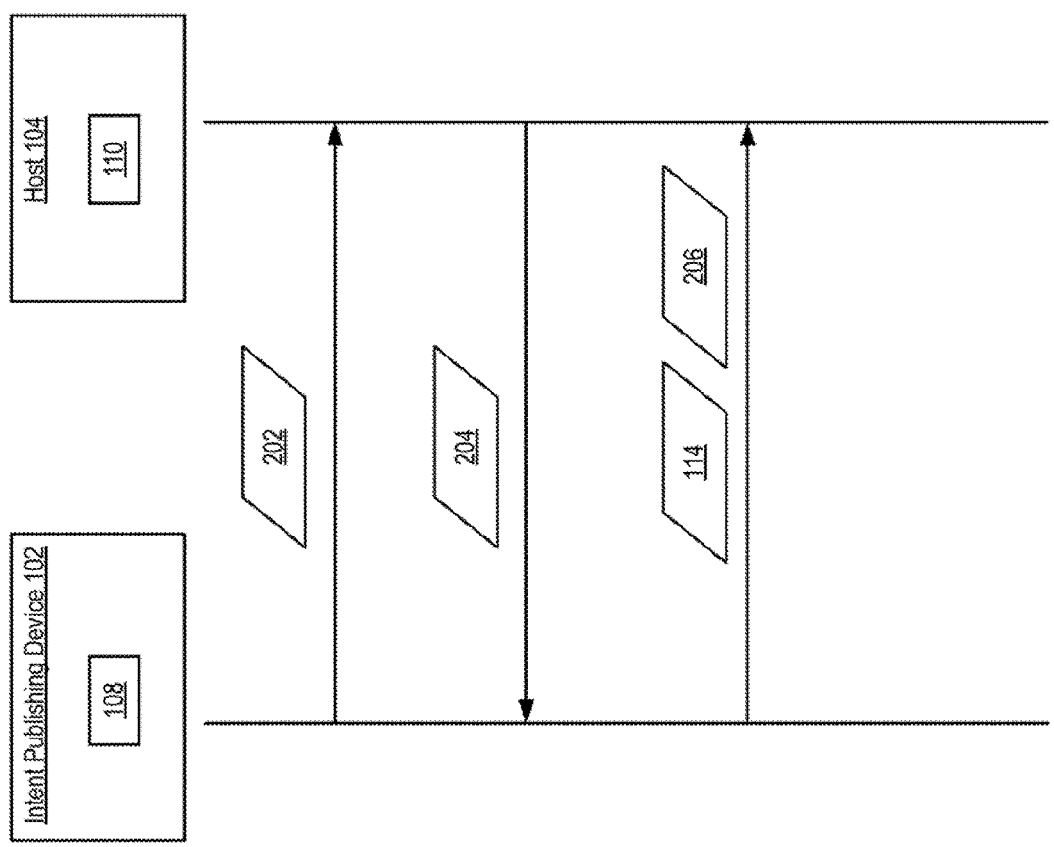
FIG. 2 illustrates a message flow between an intent publishing device and a host to publish a resource agreement, according to an example.

FIG. 2 illustrates a message flow between an intent publishing device and a host to publish a resource agreement, according to an example. Before intent publishing device 102 transmits RA 114 to host 104, host 104 is to authenticate intent publishing device 102 for security purpose. Intent publishing device 102 may transmit a publishing request 202 to host 104. Publishing request 202 may include information associated with intent publishing device 102 that is to be used for authentication. For example, publishing request 202 may include a user name and a password. As another example, publishing request 202 may include identification information 118.

In response to receiving publishing request 202, host 104 may authenticate intent publishing device 102 based on publishing request 202. In some examples, host 104 may authenticate intent publishing device 102 locally. In some examples, host 104 may authenticate intent publishing device 102 via an authentication server (not shown in FIG. 2). In response to a successful authentication, host 104 may transmit an authentication message 204 to intent publishing device 102. Authentication message 204 may indicate that intent publishing device 102 is authenticated and has permission to publish any RAs to host 104. In response to receiving authentication message 204, intent publishing device 102 may transmit a service request 206 and RA 114 associated with service request 206 to host 104. Service request 206 may describe what service intent publishing device 102 is to implement and indicate RA(s) associated with the service.

Figure 3:
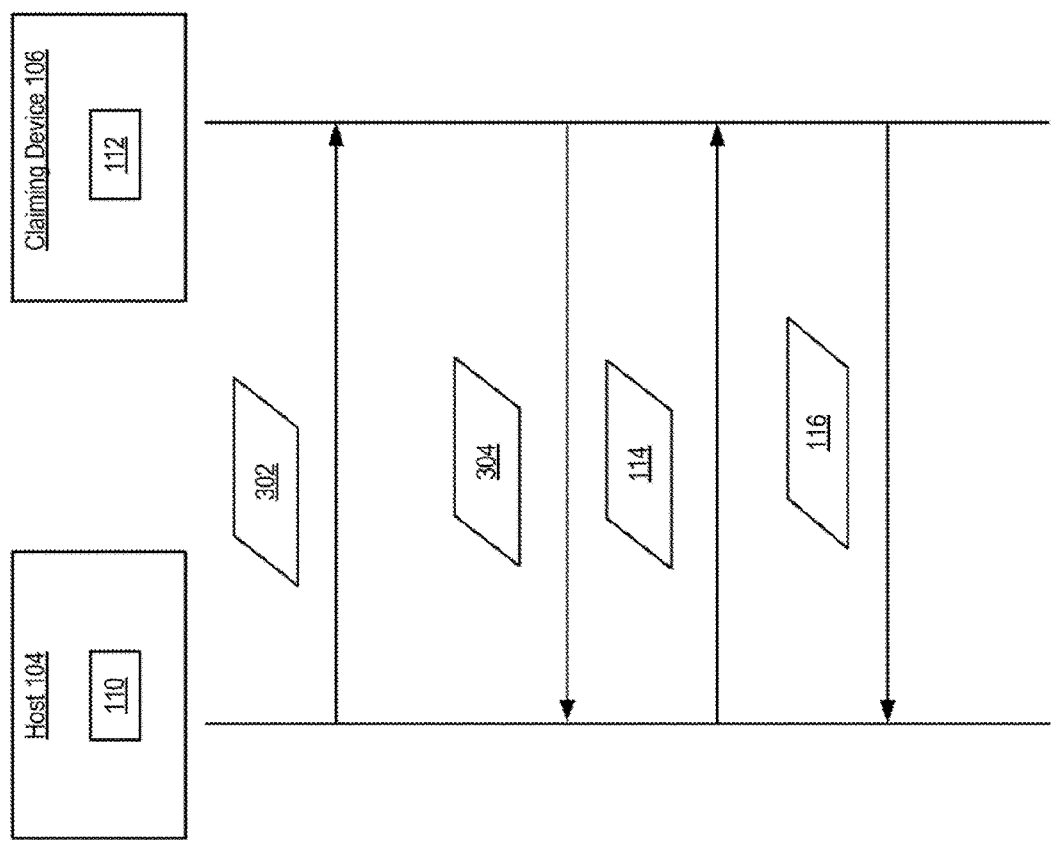
FIG. 3 illustrates a message flow between a host and a claiming device to implement a resource agreement, according to an example.

FIG. 3 illustrates a message flow between a host and a claiming device to implement a resource agreement, according to an example. During operation, host 104 may generate a service catalog 302 that describes a list of services that are to be implemented by different intent publishing devices. Host 104 may transmit service catalog 302 to claiming device 106 (e.g., via broadcasting). Claiming device 106 may examine service catalog 302 to determine if any service from service catalog 302 is of interest. Claiming device 106 may transmit a request 304 to host 104 to request RA(s) associated with a particular service. Based on request 304, host 104 may transmit RA 114 to claiming device 106. Claiming device 106 may transmit confirmation 116 to host 104 to claim RA 114.

Figure 4:
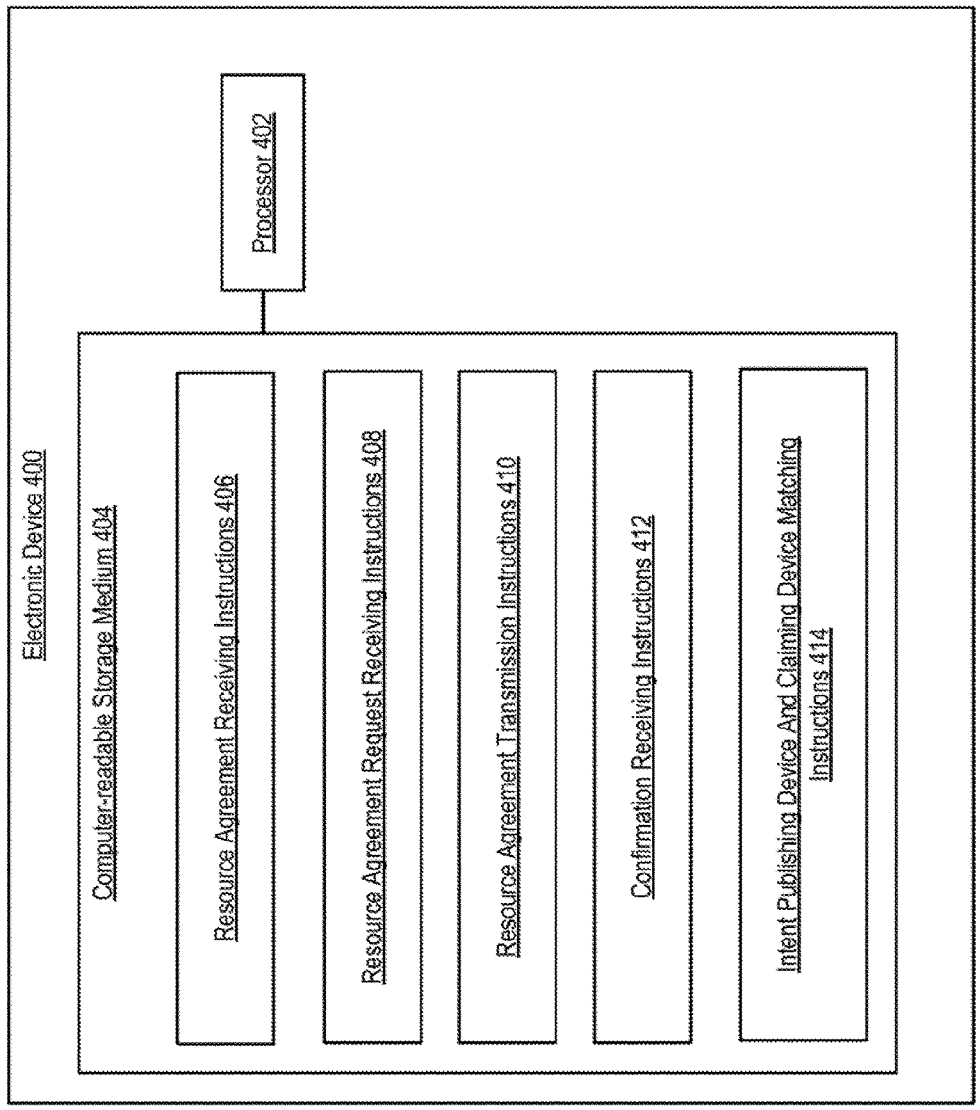
FIG. 4 illustrates an electronic device to match an intent publishing device with a claiming device, according to an example.

FIG. 4 illustrates an electronic device 400 to match an intent publishing device with a claiming device, according to an example. Electronic device 400 may implement host 104 of FIGS. 1-3. Electronic device 400 may include a processor 402 and a computer-readable storage medium 404.

Processor 402 be a central processing unit (CPU), a semiconductor-based microprocessor, and/or other hardware devices suitable to control operations of electronic device 400. Computer-readable storage medium 404 may be any electronic, magnetic, optical, or other physical storage device that contains or stores executable instructions. Thus, computer-readable storage medium 404 may be, for example, Random Access Memory (RAM), an Electrically Erasable Programmable Read-Only Memory (EEPROM), a storage device, an optical disc, etc. In some examples, computer-readable storage medium 404 may be a non-transitory storage medium, where the term "non-transitory" does not encompass transitory propagating signals. As described in detail below, computer-readable storage medium 404 may be encoded with a series of executable instructions 406-414.

Resource agreement receiving instructions 406 may receive a resource agreement (RA) from an intent publishing device. For example, referring to FIG. 1, host 104 may receive RA 114 from intent publishing device 102. Resource agreement request receiving instructions 408 may receive a request for a particular RA from a claiming device. For example, referring to FIG. 3, claiming device 106 may transmit a request 304 to host 104 to request RA(s) associated with a particular service.

Resource agreement transmission instructions 410 may transmit an RA to a claiming device. For example, referring to FIG. 1, in response to a request from claiming device 106, host 104 may transmit RA 114 to claiming device 106. Confirmation receiving instructions 412 may receive a confirmation from a claiming device to indicate that the claiming device is to implement a received RA. For example, referring to FIG. 1, host 104 may receive confirmation 116 from claiming device 106 when claiming device 106 is to implement RA 114. Intent publishing device and claiming device matching instructions 414 may match an intent publishing device and a claiming device to enable communication between the intent publishing device and the claiming device. For example, referring to FIG. 1, host 104 may transmit identification information 118 of claiming device 106 to intent publishing device 102 to match claiming device 106 with intent publishing device 102. As another example, host 104 may transmit identification information 120 of intent publishing device 102 to claiming device 106 to match claiming device 106 with intent publishing device 102.

Figure 5:
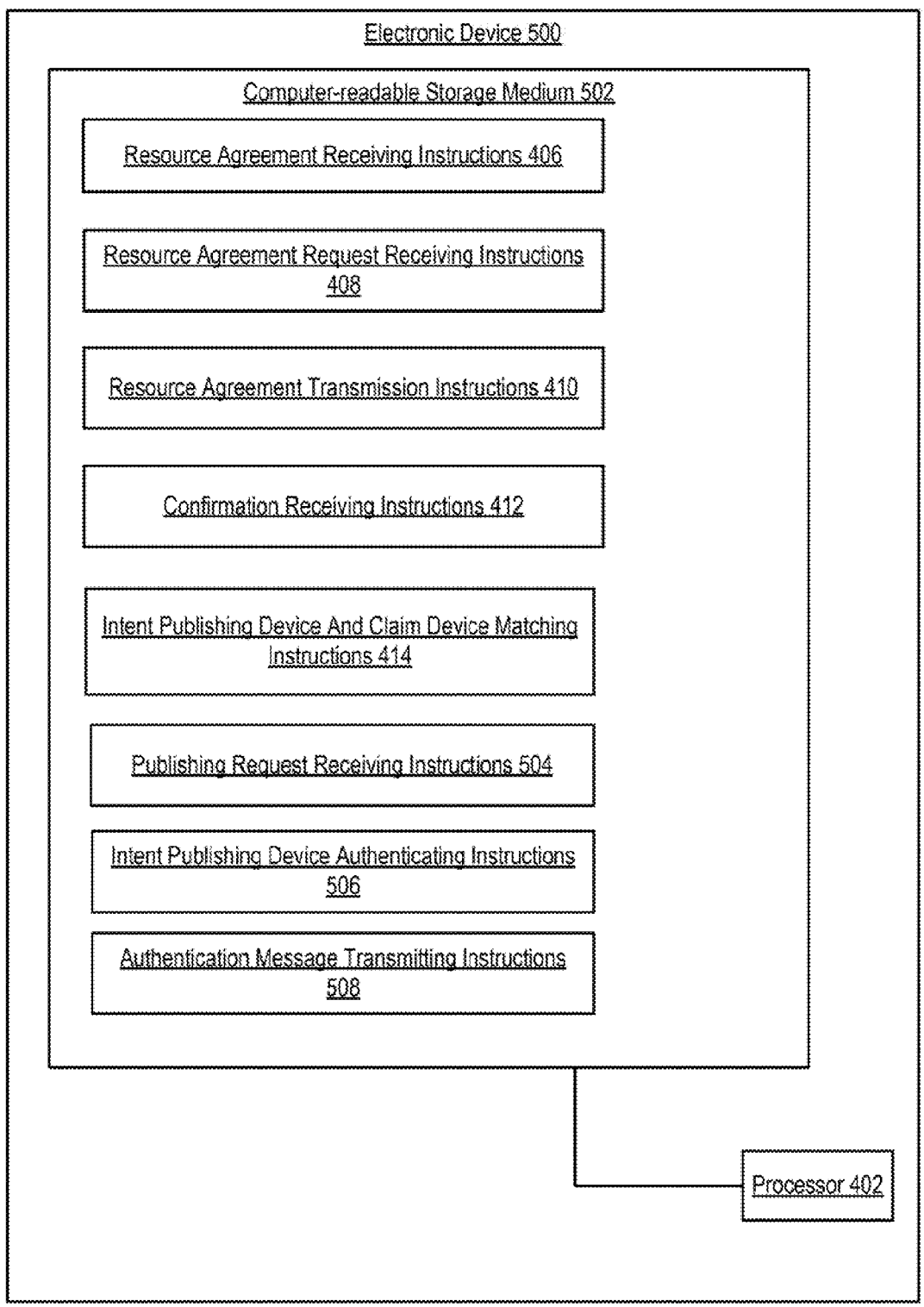
FIG. 5 illustrates an electronic device to match an intent publishing device with a claiming device, according to another example.

FIG. 5 illustrates an electronic device 500 to match an intent publishing device with a claiming device, according to another example. Electronic device 500 may be similar to electronic device 400 of FIG. 4. Electronic device 500 may include processor 402 and a computer-readable storage medium 502. Computer-readable storage medium 502 may be similar to computer-readable storage medium 404 of FIG. 4. Computer-readable storage medium 502 may be encoded with instructions 406-414 and 504-508.

Publishing request receiving instructions 504 may receive a publishing request from an intent publishing device. For example, referring to FIG. 2, host 104 may receive publishing request 202 from intent publishing device 102. Intent publishing device authenticating instructions 506 may authenticate an intent publishing device. For example, referring to FIG. 2, in response to receiving publishing request 202, host 104 may authenticate intent publishing device 102 based on publishing request 202. Authentication message transmitting instructions 508 may transmit an authentication message to an intent publishing device. For example, referring to FIG. 2, in response to a successful authentication, host 104 may transmit an authentication message 204 to intent publishing device 102.

Figure 6:
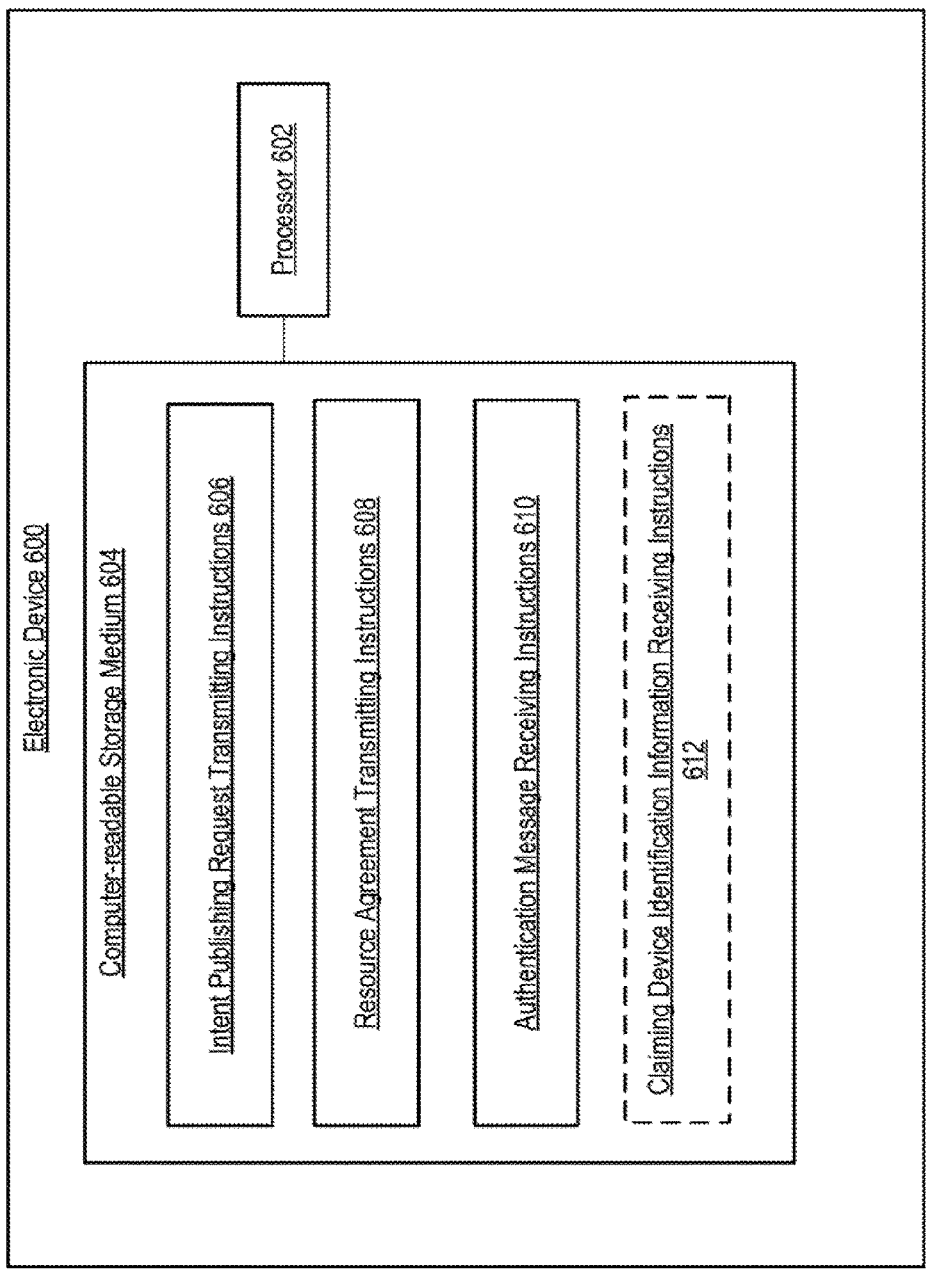
FIG. 6 illustrates an electronic device to publish a resource agreement, according to an example.

FIG. 6 illustrates an electronic device 600 to publish a resource agreement, according to an example. Electronic device 600 may implement intent publishing device 102 of FIGS. 1-2. Electronic device 600 may include a processor 602 and a computer-readable storage medium 604. Processor 602 may be similar to processor 402 of FIG. 4. Computer-readable storage medium 604 may be similar to computer-readable storage medium 404. Computer-readable storage medium 604 may be encoded with instructions 606-610.

Intent publishing request transmitting instructions 606 may transmit a publishing request to a host. For example, referring to FIG. 2, intent publishing device 102 may transmit a publishing request 202 to host 104. Resource agreement transmitting instructions 608 may transmit an RA to a host. For example, referring to FIG. 2, in response to receiving authentication message 204, intent publishing device 102 may transmit a service request 206 and RA 114 associated with service request 206 to host 104. Authentication message receiving instructions 610 may receive an authentication message from a host. For example, referring to FIG. 2, in response to a successful authentication, intent publishing device 102 may receive authentication message 204 from host 104.

In some examples, computer-readable storage medium 604 may also be encoded with claiming device identification information receiving instructions 612. Claiming device identification information receiving instructions 612 may receive identification information of a claim device from a host. For example, intent publishing device 102 may receive identification information 118 of claiming device 106 from host 104. Based on identification information 118, intent publishing device 102 may communicate with claiming device 106 to receive resource that claiming device 106 is to provide.

Figure 7:
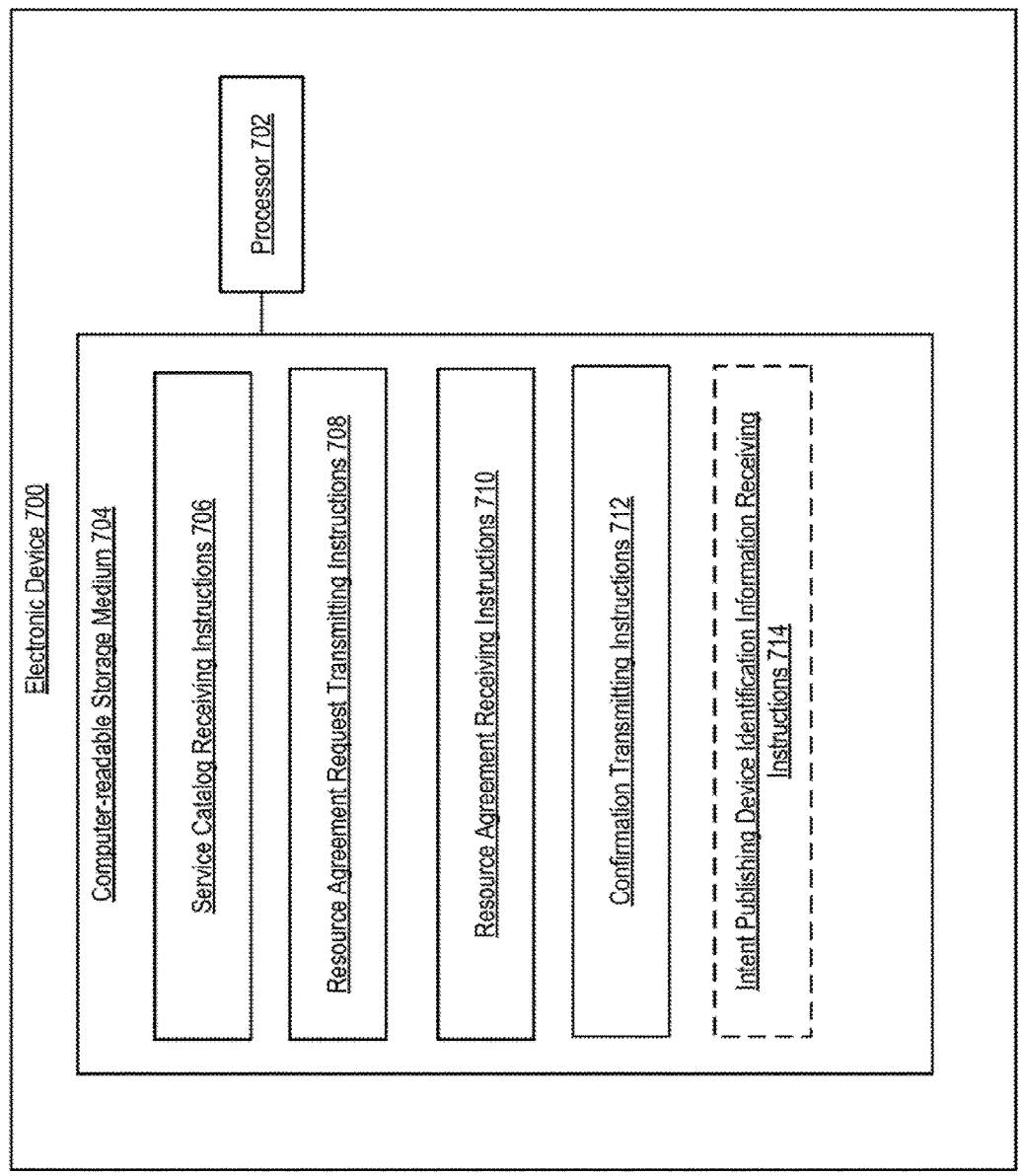
FIG. 7 illustrates an electronic device to implement a resource agreement, according to an example.

FIG. 7 illustrates an electronic device 700 to implement a resource agreement, according to an example. Electronic device 700 may implement claiming device 106 of FIGS. 1 and 3. Electronic device 700 may include a processor 702 and a computer-readable storage medium 704. Processor 702 may be similar to processor 402 of FIG. 4. Computer-readable storage medium 704 may be similar to computer-readable storage medium 404 of FIG. 4. Computer-readable storage medium 704 may be encoded with instructions 706-712.

Service catalog receiving instructions 706 may receive a service catalog from a host. For example, referring to FIG. 3, claiming device 106 may receive service catalog 302 from host 104. Resource agreement request transmitting instructions 708 may transmit a request to a host to request a particular RA. For example, referring to FIG. 3, claiming device 106 may transmit a request 304 to host 104 to request RA(s) associated with a particular service.

Resource agreement receiving instructions 710 may receive a RA from a host. For example, referring to FIG. 3, claiming device 106 may receive RA 114 from host 104. Confirmation transmitting instructions 712 may transmit a confirmation to a host. For example, referring to FIG. 3, when claiming device 106 is to implement RA 114, claiming device 106 may transmit a confirmation 116 to host 104.

In some examples, computer-readable storage medium may also be encoded with intent publishing device identification information receiving instructions 714. Intent publishing device identification information receiving instructions 714 may receive identification information of an intent publishing device from a host. For example, referring to FIG. 1, claiming device 106 may receive identification information 120 of intent publishing device 102 from host 104. Based on identification information 120, claiming device 106 may communicate with intent publishing device 102 to provide the resource.

The use of "comprising", "including" or "having" are synonymous and variations thereof herein are meant to be inclusive or open-ended and do not exclude additional unrecited elements or method steps.

What is claimed is:

1. An electronic device comprising:
    a processor; and
    a non-transitory storage medium storing instructions executable on the processor to:
        receive, from an intent publishing device, a resource agreement associated with a service to be implemented via the intent publishing device, the resource agreement stating a resource to be used for implementing the service;
        transmit the resource agreement to a claiming device;
        receive a confirmation from the claiming device, wherein the confirmation indicates that the claiming device is to implement the resource agreement by providing, by the claiming device, the resource to the intent publishing device in implementing the service; and
        match the intent publishing device with the claiming device based on the confirmation.

2. The electronic device of claim 1, wherein the instructions are executable on the processor further to:
    receive a publishing request from the intent publishing device;
    in response to the publishing request, authenticate the intent publishing device; and
    transmit an authentication message to the intent publishing device, wherein the authentication message indicates the intent publishing device is authenticated.

3. The electronic device of claim 1, wherein the resource stated in the resource agreement comprises a hardware component used to implement the service via the intent publishing device.

4. The electronic device of claim 1, wherein the resource stated in the resource agreement comprises processor executable instructions used to implement the service via the intent publishing device.

5. The electronic device of claim 1, wherein the intent publishing device is a claiming device associated with a second service.

6. The electronic device of claim 1, wherein the instructions are executable on the processor to match the intent publishing device with the claiming device by sending identification information of the claiming device to the intent publishing device, to enable communication of the intent publishing device with the claiming device as part of providing, by the claiming device, the resource to the intent publishing device.

7. The electronic device of claim 1, wherein the instructions are executable on the processor to match the intent publishing device with the claiming device by sending identification information of the intent publishing device to the claiming device, to enable communication of the intent publishing device with the claiming device as part of providing, by the claiming device, the resource to the intent publishing device.

8. The electronic device of claim 1, wherein the resource stated in the resource agreement comprises a sensor, and wherein the confirmation indicates that the claiming device is to provide the sensor for use by the intent publishing device in implementing the service.

9. The electronic device of claim 1, wherein the resource stated in the resource agreement comprises a camera, wherein the confirmation indicates that the claiming device is to provide the camera for use by the intent publishing device in implementing the service.

10. The electronic device of claim 1, wherein the resource stated in the resource agreement comprises a program, wherein the confirmation indicates that the claiming device is to provide the program for use by the intent publishing device in implementing the service.

11. A non-transitory computer-readable storage medium comprising instructions that when executed cause an electronic device to:
    receive, from an intent publishing device, a service request and a resource agreement associated with the service request, wherein the service request describes a service the intent publishing device is to implement, and the resource agreement states a resource to be used for implementing the service;
    receive a request associated with the service from a claiming device;

transmit the resource agreement to the claiming device based on the request from the claiming device;

receive a confirmation from the claiming device, wherein the confirmation indicates that the claiming device is to implement the resource agreement by providing, by the claiming device, the resource to the intent publishing device in implementing the service; and match the intent publishing device with the claiming device based on the confirmation to enable communication by the intent publishing device with the claiming device as part of providing, by the claiming device, the resource stated in the resource agreement to the intent publishing device.

12. The non-transitory computer-readable storage medium of claim 11, wherein the instructions when executed further cause the electronic device to:

receive a publishing request from the intent publishing device;

in response to the publishing request, authenticate the intent publishing device; and transmit an authentication message to the intent publishing device, wherein the authentication message indicates the intent publishing device is authenticated.

13. The non-transitory computer-readable storage medium of claim 11, wherein the resource stated in the resource agreement comprises a hardware component used to implement the service via the intent publishing device.

14. The non-transitory computer-readable storage medium of claim 11, wherein the resource stated in the resource agreement comprises processor executable instructions used to implement the service via the intent publishing device.

15. An electronic device comprising:
a processor; and
a non-transitory storage medium storing instructions executable on the processor to:

receive a service catalog from a host;

transmit a request to the host to request a resource agreement associated with a service in the service catalog;

receive the resource agreement from the host, the resource agreement stating a resource to be used for implementing the service by an intent publishing device that is different from the electronic device; and transmit a confirmation to the host, wherein the confirmation indicates that the electronic device is to implement the resource agreement by providing, by the electronic device, the resource stated in the resource agreement to the intent publishing device in implementing the service.

16. The electronic device of claim 15, wherein the instructions are executable on the processor to receive identification information of the intent publishing device to implement the service.

17. The electronic device of claim 15, wherein the resource stated in the resource agreement comprises a hardware component used to implement the service via the intent publishing device.

18. The electronic device of claim 15, wherein the resource stated in the resource agreement comprises processor executable instructions used to implement the service via the intent publishing device.

19. The electronic device of claim 15, wherein the service catalog identifies a list of services to be implemented.

20. The electronic device of claim 15, wherein the resource agreement is transmitted by the intent publishing device.

* * * * *